United States Patent
Tayal et al.

(10) Patent No.: US 9,785,739 B1
(45) Date of Patent: Oct. 10, 2017

(54) SYSTEM AND METHOD FOR FLUID PARAMETERIZED CELL EVALUATION

(71) Applicant: Cadence Design Systems, Inc., San Jose, CA (US)

(72) Inventors: Reenee Tayal, Delhi (IN); Vishal Agarwal, Noida (IN); Mayank Sharma, Noida (IN); Farhat Alam Khan, Ghaziabad (IN)

(73) Assignee: Cadence Design Systems, Inc., San Jose, CA (US)

( * ) Notice: Subject to any disclaimer, the term of this patent is extended or adjusted under 35 U.S.C. 154(b) by 59 days.

(21) Appl. No.: 14/973,922

(22) Filed: Dec. 18, 2015

(51) Int. Cl.
*G06F 17/50* (2006.01)

(52) U.S. Cl.
CPC ...... *G06F 17/5081* (2013.01); *G06F 17/5068* (2013.01)

(58) Field of Classification Search
CPC .......................... G06F 17/5081; G06F 17/5068
USPC ....................................................... 716/111
See application file for complete search history.

(56) References Cited

U.S. PATENT DOCUMENTS

| | | | | |
|---|---|---|---|---|
| 7,506,277 | B1 * | 3/2009 | Arora et al. | 716/122 |
| 9,122,834 | B1 * | 9/2015 | Caluya | G06F 17/5081 |
| 9,690,893 | B1 * | 6/2017 | Ferguson | G06F 17/5081 |
| 2010/0287519 | A1 * | 11/2010 | Su | 716/10 |
| 2011/0061034 | A1 * | 3/2011 | Ginetti et al. | 716/104 |
| 2011/0219349 | A1 * | 9/2011 | Foster | G06F 17/50 716/136 |
| 2014/0304671 | A1 * | 10/2014 | Lu | G06F 17/5068 716/119 |
| 2015/0143310 | A1 * | 5/2015 | Chen | G06F 17/5045 716/107 |
| 2015/0347667 | A1 * | 12/2015 | Ellis-Monaghan | G06F 17/5081 716/112 |

* cited by examiner

*Primary Examiner* — Suchin Parihar
(74) *Attorney, Agent, or Firm* — Mark H. Whittenberger, Esq.; Holland & Knight LLP

(57) ABSTRACT

The present disclosure relates to a system and method for fluid parameterized cell (Pcell) evaluation. Embodiments may include displaying a fluid Pcell in a first format. Embodiments may further include identifying a first state in a fluid Pcell evaluation code. In some embodiments, the first state may indicate that alterations are being made to the fluid Pcell. Embodiments may also include displaying instances of the fluid Pcell in a second format based upon, at least in part, identifying the first state in the fluid Pcell evaluation code. Embodiments may further include identifying a second state in the fluid Pcell evaluation code. In some embodiments, the second state may indicate the completion of the alterations to the fluid Pcell. Embodiments may also include displaying a final instance of the fluid Pcell in the first format based upon, at least in part, identifying the second state in the fluid Pcell evaluation code.

20 Claims, 10 Drawing Sheets

SYSTEM AND METHOD FOR FLUID PARAMETERIZED CELL EVALUATION

FIELD OF THE INVENTION

The present disclosure relates to electronic design automation (EDA), and more specifically, to a system and method for fluid parameterized cell (Pcell) evaluation.

DISCUSSION OF THE RELATED ART

EDA utilizes software tools that may be used in the design and analysis of numerous electronic systems such as printed circuit boards (PCBs) and integrated circuits (ICs). Within an EDA, a parameterized cell (Pcell) may be created or edited. A fluid Pcell can provide a way to dynamically generate cell view contents based on graphically configured parameter values. During interactive creating and/or editing of a fluid Pcell within an EDA, the evaluation of fluid Pcell sub masters can cause delays. A delay may be observed as a visible lag between mouse pointer and geometries being dragged. Further, the evaluation of fluid Pcell sub masters may significantly increase memory utilization. Therefore, it is of interest to reduce the memory utilized and to reduce other associated delays during creating and/or editing of a Pcell.

SUMMARY OF INVENTION

In one or more embodiments of the present disclosure, a computer-implemented method is provided. The method may include displaying, using a processor, a fluid parameterized cell (Pcell) in a first format. The method may further include identifying a first state in a fluid Pcell evaluation code. In some embodiments, the first state may indicate that one or more alterations are being made to the fluid Pcell. The method may also include displaying one or more instances of the fluid Pcell in a second format based upon, at least in part, identifying the first state in the fluid Pcell evaluation code. The method may further include identifying a second state in the fluid Pcell evaluation code. In some embodiments, the second state may indicate the completion of the one or more alterations to the fluid Pcell. The method may also include displaying a final instance of the one or more instances of the fluid Pcell in the first format based upon, at least in part, identifying the second state in the fluid Pcell evaluation code.

One or more of the following features may be included. In some embodiments, the first format may include a plurality of geometries. In some embodiments, the second format may include at least one geometry less than the plurality of geometries of the first format. The method may include setting one or more parameters of the one or more instances of the fluid Pcell to one or more default values based upon, at least in part, identifying the first state in the fluid Pcell evaluation code. The method may also include setting the one or more parameters of the final instance of the one or more instances of the fluid Pcell to one or more values based upon, at least in part, identifying the second state in the fluid Pcell evaluation code. The method may further include evaluating the final instance of the one or more instances of the fluid Pcell to verify that the first format of the final instance of the fluid Pcell is equivalent to the first format of the fluid Pcell based upon, at least in part, the one or more values of the one or more parameters. In some embodiments, the one or more values may be one or more timestamp values.

In some embodiments, a computer-readable storage medium for electronic design simulation is provided. The computer-readable storage medium may have stored thereon instructions that when executed by a machine result in one or more operations. Operations may include displaying, using a processor, a fluid parameterized cell (Pcell) in a first format. Operations may further include identifying a first state in a fluid Pcell evaluation code. In some embodiments, the first state may indicate that one or more alterations are being made to the fluid Pcell. Operations may also include displaying one or more instances of the fluid Pcell in a second format based upon, at least in part, identifying the first state in the fluid Pcell evaluation code. Operations may further include identifying a second state in the fluid Pcell evaluation code, wherein the second state may indicate the completion of the one or more alterations to the fluid Pcell. Operations may also include displaying a final instance of the one or more instances of the fluid Pcell in the first format based upon, at least in part, identifying the second state in the fluid Pcell evaluation code.

One or more of the following features may be included. In some embodiments, the first format may include a plurality of geometries. In some embodiments, the second format may include at least one geometry less than the plurality of geometries of the first format. Operations may include setting one or more parameters of the one or more instances of the fluid Pcell to one or more default values based upon, at least in part, identifying the first state in the fluid Pcell evaluation code. Operations may also include setting the one or more parameters of the final instance of the one or more instances of the fluid Pcell to one or more values based upon, at least in part, identifying the second state in the fluid Pcell evaluation code. Operations may further include evaluating the final instance of the one or more instances of the fluid Pcell to verify that the first format of the final instance of the fluid Pcell is equivalent to the first format of the fluid Pcell based upon, at least in part, the one or more values of the one or more parameters. In some embodiments, the one or more values may be one or more timestamp values.

In one or more embodiments of the present disclosure, a system may include a computing device having at least one processor configured to display a fluid parameterized cell (Pcell) in a first format. The at least one processor may be further configured to identify a first state in a fluid Pcell evaluation code. In some embodiments, the first state may indicate that one or more alterations are being made to the fluid Pcell. The at least one processor may be further configured to display one or more instances of the fluid Pcell in a second format based upon, at least in part, identifying the first state in the fluid Pcell evaluation code. The at least one processor may also be configured to identify a second state in the fluid Pcell evaluation code, wherein the second state indicates the completion of the one or more alterations to the fluid Pcell. The at least one processor may further be configured to display a final instance of the one or more instances of the fluid Pcell in the first format based upon, at least in part, identifying the second state in the fluid Pcell evaluation code.

One or more of the following features may be included. In some embodiments, the first format may include a plurality of geometries. In some embodiments, the second format may include at least one geometry less than the plurality of geometries of the first format. The at least one processor may be further configured to set one or more parameters of the one or more instances of the fluid Pcell to one or more default values based upon, at least in part, the identification of the first state in the fluid Pcell evaluation code. The at least one processor may be further configured to modify the one or more parameters of the final instance of the one or more instances of the fluid Pcell to one or more values based upon, at least in part, the identification of the second state in the fluid Pcell evaluation code. The at least one processor may also be configured to evaluate the final instance of the one or more instances of the fluid Pcell to verify that the first format of the final instance of the fluid Pcell is equivalent to the first format of the fluid Pcell based upon, at least in part, the one or more values of the one or more parameters.

Additional features and advantages of embodiments of the present disclosure will be set forth in the description which follows, and in part will be apparent from the description, or may be learned by practice of embodiments of the present disclosure. The objectives and other advantages of the embodiments of the present disclosure may be realized and attained by the structure particularly pointed out in the written description and claims hereof as well as the appended drawings.

It is to be understood that both the foregoing general description and the following detailed description are exemplary and explanatory and are intended to provide further explanation of embodiments of the invention as claimed.

BRIEF DESCRIPTION OF THE DRAWINGS

The accompanying drawings, which are included to provide a further understanding of embodiments of the present disclosure and are incorporated in and constitute a part of this specification, illustrate embodiments of the present disclosure and together with the description serve to explain the principles of embodiments of the present disclosure.

DETAILED DESCRIPTION

Reference will now be made in detail to the embodiments of the present disclosure, examples of which are illustrated in the accompanying drawings. The present disclosure may, however, be embodied in many different forms and should not be construed as being limited to the embodiments set forth herein. Rather, these embodiments are provided so that this disclosure will be thorough and complete, and will fully convey the concept of the disclosure to those skilled in the art.

Figure 1:
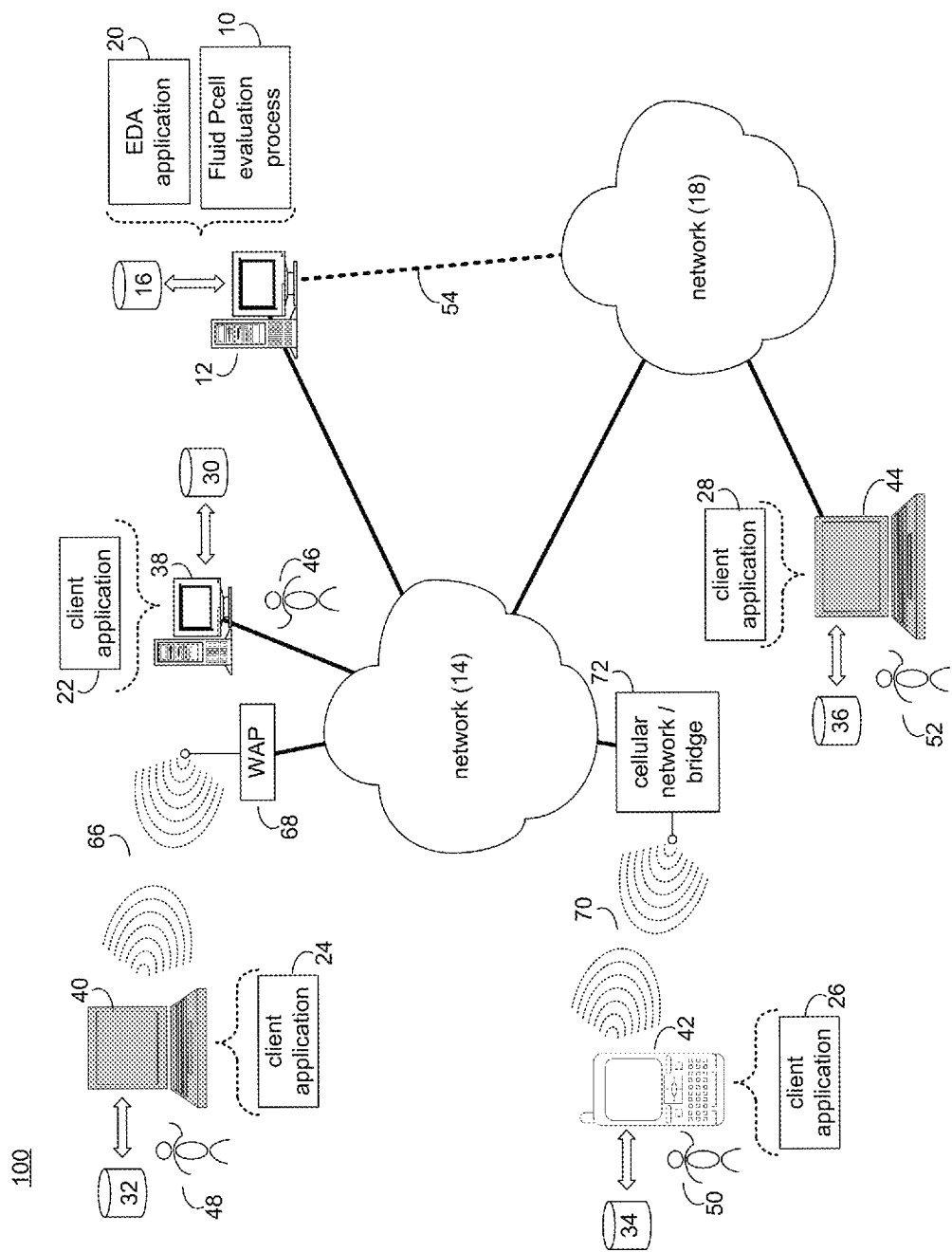
FIG. 1 is a system diagram depicting aspects of the fluid Pcell evaluation process in accordance with an embodiment of the present disclosure.

Referring to FIG. 1, there is shown fluid Pcell evaluation process 10 that may reside on and may be executed by server computer 12, which may be connected to network 14 (e.g., the Internet or a local area network). Examples of server computer 12 may include, but are not limited to: a personal computer, a server computer, a series of server computers, a mini computer, and a mainframe computer. Server computer 12 may be a web server (or a series of servers) running a network operating system, examples of which may include but are not limited to: Microsoft® Windows® Server; Novell® NetWare®; or Red Hat® Linux®, for example. (Microsoft and Windows are registered trademarks of Microsoft Corporation in the United States, other countries or both; Novell and NetWare are registered trademarks of Novell Corporation in the United States, other countries or both; Red Hat is a registered trademark of Red Hat Corporation in the United States, other countries or both; and Linux is a registered trademark of Linus Torvalds in the United States, other countries or both.) Additionally/alternatively, the fluid Pcell evaluation process may reside on and be executed, in whole or in part, by a client electronic device, such as a personal computer, notebook computer, personal digital assistant, or the like.

The instruction sets and subroutines of fluid Pcell evaluation process 10, which may include one or more software modules, and which may be stored on storage device 16 coupled to server computer 12, may be executed by one or more processors (not shown) and one or more memory modules (not shown) incorporated into server computer 12. Storage device 16 may include but is not limited to: a hard disk drive; a solid state drive, a tape drive; an optical drive; a RAID array; a random access memory (RAM); and a read-only memory (ROM). Storage device 16 may include various types of files and file types including but not limited, to hardware description language (HDL) files, which may contain the port type descriptions and executable specifications of hardware blocks.

Server computer 12 may execute a web server application, examples of which may include but are not limited to: Microsoft IIS, Novell Webserver™, or Apache® Webserver, that allows for HTTP (i.e., HyperText Transfer Protocol) access to server computer 12 via network 14 (Webserver is a trademark of Novell Corporation in the United States, other countries, or both; and Apache is a registered trademark of Apache Software Foundation in the United States, other countries, or both). Network 14 may be connected to one or more secondary networks (e.g., network 18), examples of which may include but are not limited to: a local area network; a wide area network; or an intranet, for example.

Server computer 12 may execute an electronic design automation (EDA) application (e.g., EDA application 20), examples of which may include, but are not limited to those available from the assignee of the present application. EDA application 20 may interact with one or more EDA client applications (e.g., EDA client applications 22, 24, 26, 28). EDA application 20 may be referred to herein as a design tool.

Fluid Pcell evaluation process 10 may be a stand-alone application, or may be an applet/application/script that may interact with and/or be executed within EDA application 20. In addition/as an alternative to being a server-side process, the fluid Pcell evaluation process may be a client-side process (not shown) that may reside on a client electronic device (described below) and may interact with an EDA client application (e.g., one or more of EDA client applications 22, 24, 26, 28). Further, the fluid Pcell evaluation process may be a hybrid server-side/client-side process that may interact with EDA application 20 and an EDA client application (e.g., one or more of client applications 22, 24, 26, 28). As such, the fluid Pcell evaluation process may reside, in whole, or in part, on server computer 12 and/or one or more client electronic devices.

The instruction sets and subroutines of EDA application 20, which may be stored on storage device 16 coupled to server computer 12 may be executed by one or more processors (not shown) and one or more memory modules (not shown) incorporated into server computer 12.

The instruction sets and subroutines of EDA client applications 22, 24, 26, 28, which may be stored on storage devices 30, 32, 34, 36 (respectively) coupled to client electronic devices 38, 40, 42, 44 (respectively), may be executed by one or more processors (not shown) and one or more memory modules (not shown) incorporated into client electronic devices 38, 40, 42, 44 (respectively). Storage devices 30, 32, 34, 36 may include but are not limited to: hard disk drives; solid state drives, tape drives; optical drives; RAID arrays; random access memories (RAM); read-only memories (ROM), compact flash (CF) storage devices, secure digital (SD) storage devices, and a memory stick storage devices. Examples of client electronic devices 38, 40, 42, 44 may include, but are not limited to, personal computer 38, laptop computer 40, mobile computing device 42 (such as a smart phone, netbook, or the like), notebook computer 44, for example. Using client applications 22, 24, 26, 28, users 46, 48, 50, 52 may access EDA application 20 and may allow users to e.g., utilize fluid Pcell evaluation process 10.

Users 46, 48, 50, 52 may access EDA application 20 directly through the device on which the client application (e.g., client applications 22, 24, 26, 28) is executed, namely client electronic devices 38, 40, 42, 44, for example. Users 46, 48, 50, 52 may access EDA application 20 directly through network 14 or through secondary network 18. Further, server computer 12 (i.e., the computer that executes EDA application 20) may be connected to network 14 through secondary network 18, as illustrated with phantom link line 54.

The various client electronic devices may be directly or indirectly coupled to network 14 (or network 18). For example, personal computer 38 is shown directly coupled to network 14 via a hardwired network connection. Further, notebook computer 44 is shown directly coupled to network 18 via a hardwired network connection. Laptop computer 40 is shown wirelessly coupled to network 14 via wireless communication channel 66 established between laptop computer 40 and wireless access point (i.e., WAP) 68, which is shown directly coupled to network 14. WAP 68 may be, for example, an IEEE 802.11a, 802.11b, 802.11g, Wi-Fi, and/or Bluetooth device that is capable of establishing wireless communication channel 66 between laptop computer 40 and WAP 68. Mobile computing device 42 is shown wirelessly coupled to network 14 via wireless communication channel 70 established between mobile computing device 42 and cellular network/bridge 72, which is shown directly coupled to network 14.

As is known in the art, all of the IEEE 802.11x specifications may use Ethernet protocol and carrier sense multiple access with collision avoidance (i.e., CSMA/CA) for path sharing. The various 802.11x specifications may use phase-shift keying (i.e., PSK) modulation or complementary code keying (i.e., CCK) modulation, for example. As is known in the art, Bluetooth is a telecommunications industry specification that allows e.g., mobile phones, computers, and personal digital assistants to be interconnected using a short-range wireless connection.

Client electronic devices 38, 40, 42, 44 may each execute an operating system, examples of which may include but are not limited to Microsoft Windows, Microsoft Windows CE®, Red Hat Linux, or other suitable operating system. (Windows CE is a registered trademark of Microsoft Corporation in the United States, other countries, or both).

As used herein, "Pcell" may refer to a parameterized cell, "FGR" may refer to Fluid Guard Ring, and "API" may refer to an Application Program Interface.

Figure 2:
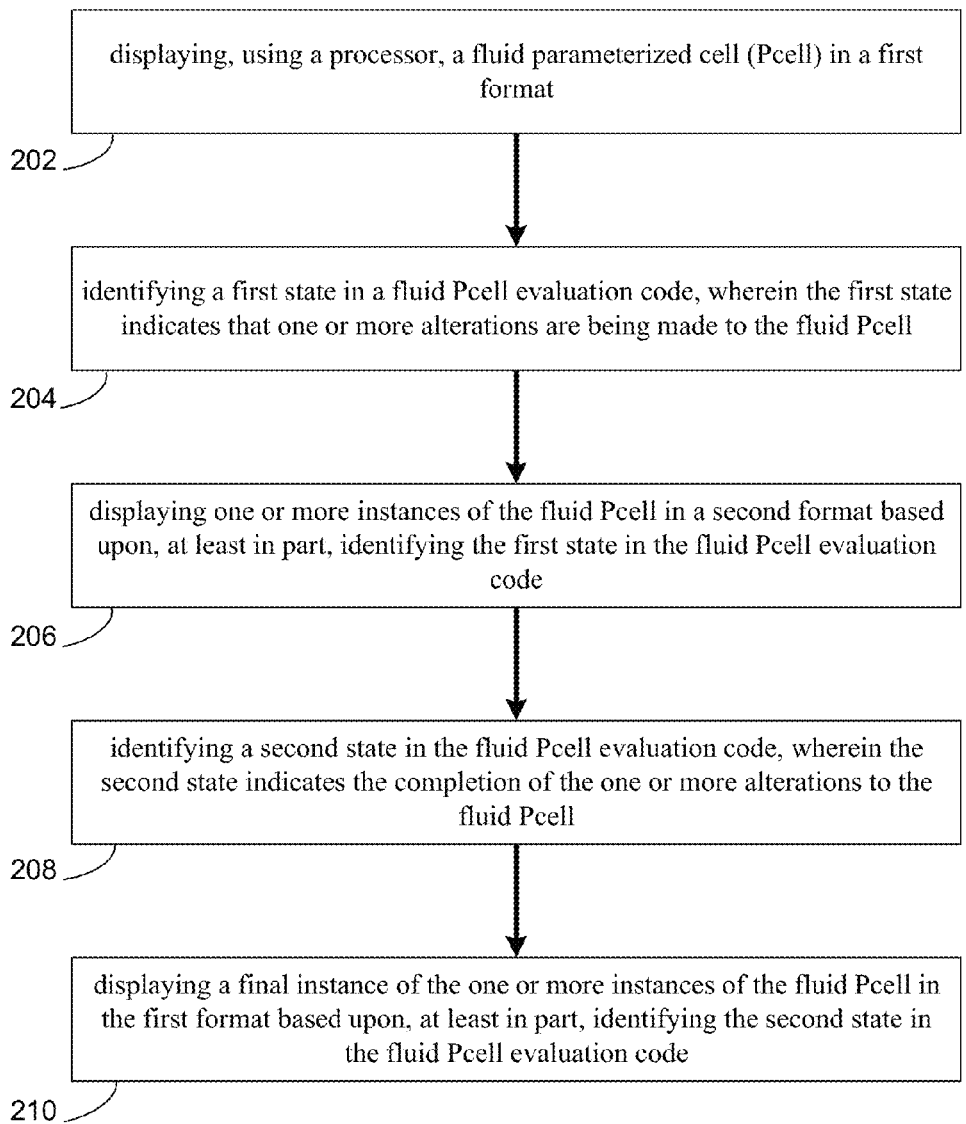
FIG. 2 is a flowchart depicting operations consistent with the fluid Pcell evaluation process of the present disclosure.

Referring to FIGS. 2-10, various embodiments consistent with fluid Pcell evaluation process 10 are provided. As shown in FIG. 2, embodiments of fluid Pcell evaluation process 10 may include displaying (202), using a processor, a fluid parameterized cell (Pcell) in a first format. Embodiments may further include identifying (204) a first state in a fluid Pcell evaluation code. Embodiments may also include displaying (206) one or more instances of the fluid Pcell in a second format based upon, at least in part, identifying the first state in the fluid Pcell evaluation code. Embodiments may also include identifying (208) a second state in the fluid Pcell evaluation code and displaying (210) a final instance of the one or more instances of the fluid Pcell in the first format based upon, at least in part, identifying the second state in the fluid Pcell evaluation code.

Figure 3:
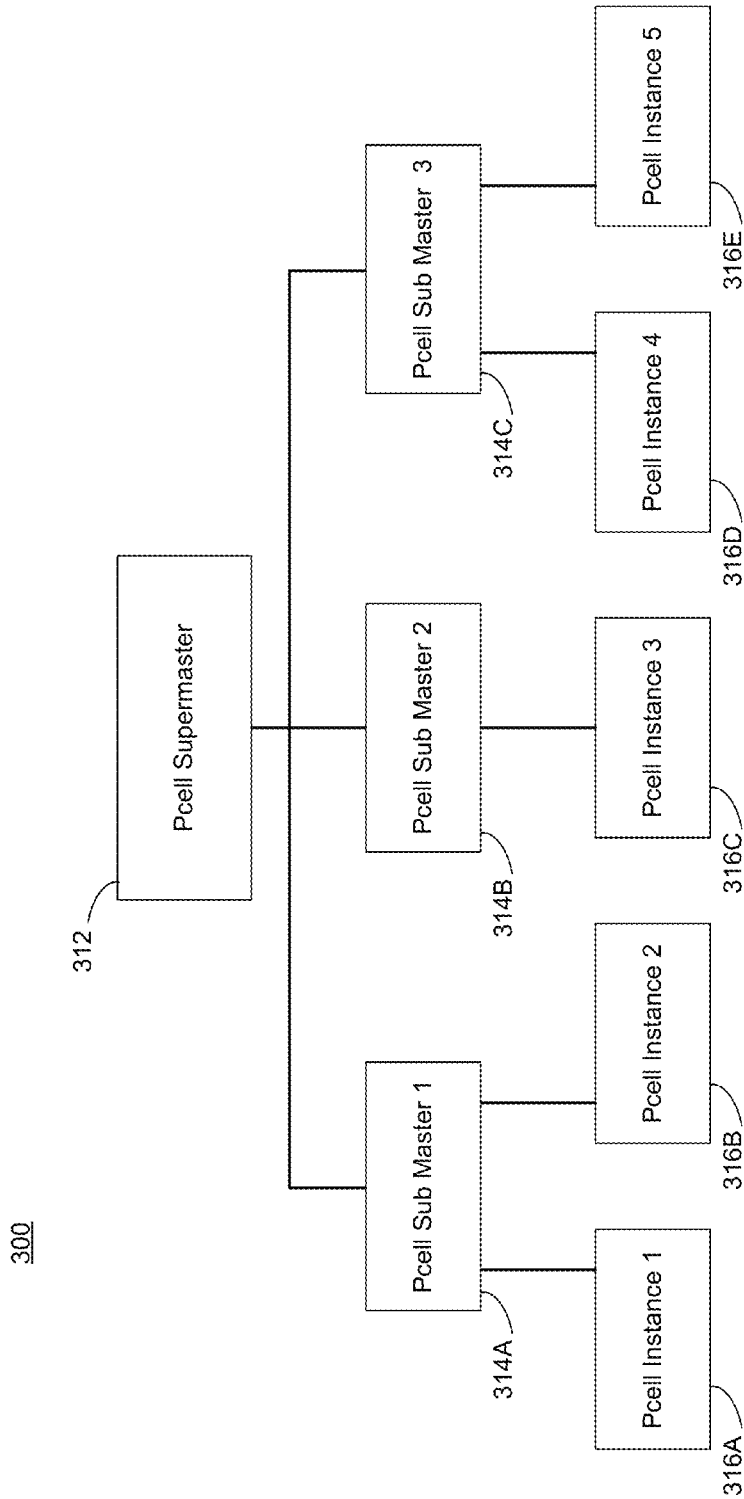
FIG. 3 is a schematic depicting aspects of the fluid Pcell evaluation process in accordance with an embodiment of the present disclosure.

In some embodiments and as shown in FIG. 3, fluid Pcell evaluation process 10 may include displaying, using a processor, a fluid Pcell in a first format. A Pcell, or parameterized cell, may provide a way for dynamic generation of cell view contents based upon, at least in part, one or more parameters. A parameter may be a setting that controls one or more of the size, shape, position, and/or contents, etc. of a Pcell instance. A Pcell super master 312 may reside in virtual memory and may contain the Pcell evaluation code, one or more parameter definitions and/or the default values for each parameter. A Pcell sub master 314A, 314B, 314C may be created in virtual memory for each unique set of parameter values assigned to an instance (e.g., Pcell instance 316A, 316B, 316C, 316D, 316E) of the super master. A Pcell sub master 314A, 314B, 314C as used herein may include, but is not limited to, a cell in memory containing the results of an evaluation of the Pcell evaluation code against the one or more parameters and/or a cell in memory containing unique geometries produced by a unique set of parameter values. A Pcell instance 316A, 316B, 316C, 316D, 316E as used herein may include, but is not limited to, a copy or instance of a Pcell sub master 314A, 314B, 314C that has been evaluated. As used herein, "Pcell" and "Pcell instance" may be used interchangeably within the scope of the present disclosure. Pcell evaluation code as used herein may include, but is not limited to, the code (e.g., SKILL code as available from the assignee of the present disclosure) that may be evaluated with the one or more parameters to generate a Pcell sub master. Although, embodiments of the present disclosure may make reference to "SKILL" code, it should be noted that any suitable code may be used in accordance with the teachings of the present disclosure.

In some embodiments, the evaluation of a Pcell evaluation code may depend upon, at least in part, the number of geometries of the Pcell sub master. As will be discussed in greater detail below, one or more portions of an evaluation code and/or one or more types of evaluation codes may be evaluated based upon, at least in part, identification of a state of the evaluation code. In some embodiments, different values for the one or more parameters can create different Pcell instances 316A, 316B, 316C, 316D, 316E. In some embodiments, creating and/or evaluating a Pcell instance 316A, 316B, 316C, 316D, 316E may include, but is not limited to, creating a Pcell sub master 314A, 314B, 314C and filling the Pcell sub master 314A, 314B, 314C with the evaluation of the Pcell evaluation code against the Pcell parameters.

For example, Pcell instance 1 316A may be created with one or more parameters. Pcell sub master 1 314A may be created and evaluated with the one or more parameters of Pcell instance 1 316A. Pcell instance 2 316B may include the same parameters as Pcell instance 1 316A. Pcell instance 2 316B may be created by determining if a Pcell sub master already has the same parameters as Pcell instance 2 316B. In this example, because Pcell sub master 1 314A has already been evaluated with the same parameters as Pcell instance 2 316B, a new Pcell sub master does not need to be created/evaluated and Pcell instance 2 316B may reference the already created Pcell sub master 1 314A. However, Pcell instance 3 316C may not include the same parameter values and may require creating a new Pcell sub master 2 314B and evaluating Pcell sub master 2 314B based upon the parameters of Pcell instance 3 316C. In some embodiments, a new Pcell sub master may be generated for each unique set of parameters, that has not already been evaluated in a Pcell sub master.

A fluid Pcell instance as used herein may include, but is not limited to, a Pcell instance with one or more fluid shapes where one or more parameters may be altered or edited. A fluid Pcell may be edited graphically (like shapes) and whose behavior in response to editing commands can be defined and customized using the SKILL language or any other programming language. Examples of fluid Pcells may include, but are not limited to, guard rings, space filling capacitors, and filling structures.

Fluid shapes as used herein may include, but are not limited to, one or more shapes of a design. In some embodiments, the one or more fluid shapes may be edited graphically. In other words, a fluid shape is a special geometry that may be added to Pcell to make it fluid in nature. In some embodiments, the one or more fluid shapes within a sub master may be edited as if they were top level shapes such that the Pcell instance is editable like a shape. A fluid shape may include any shape that is registered using the dbSetFluidShape SKILL API. In some embodiments involving SKILL API or other coding language, a fluid shape may be defined using parameters including, but not limited to, shapeType and shapeData. In other embodiments, fluid shapes may include one or more styles including, but not limited to, a path, polygon, rectangle, or any other style within the scope of the present disclosure.

In other embodiments, the one or more fluid shapes may be edited without having to define stretch handles in the Pcell evaluation code. A stretch handle as used herein may include, but is not limited to, a handle that may stretch a shape at one or more pre-defined points. While a stretch handle may be limited to stretching a shape, a fluid shape may provide other editing capabilities and/or editing commands. Examples of editing capabilities and/or editing commands for a fluid shape may include, but are not limited to, stretching, chopping, merging, splitting, reshaping, etc. In some embodiments, altering a fluid Pcell or an instance of a fluid Pcell graphically may update the value of the parameters associated with the fluid Pcell. In some embodiments, a set of "updater" functions may be associated with a Pcell super master 312 that may be called in response to one or more editing commands.

In some embodiments, a fluid Pcell may be displayed in many formats such as a first format, a second format, etc. A first format, as used herein, may include, but is not limited to, a complete rendering of the fluid Pcell, a drawing of the fluid Pcell including a plurality of geometries, and a display of the fluid Pcell including every geometry of the fluid Pcell super master. Accordingly, the terms "rendering", "displaying" and "drawing" may be used synonymously within the scope of the present disclosure. The second format will be discussed in greater detail below. In some embodiments, a fluid Pcell may be displayed in a first or second format based upon, at least in part, the evaluation code of the fluid Pcell. As will be explained in greater detail below, a first portion of the evaluation code and/or a first type of evaluation code may be evaluated to display a fluid Pcell in a second format. In some embodiments, a second portion of the evaluation code and/or a second type of evaluation code may be evaluated to display a fluid Pcell in a first format.

Figure 4:
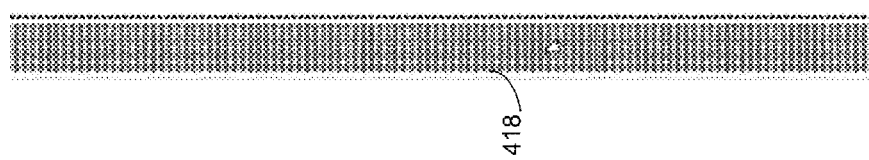
FIG. 4 is a schematic depicting aspects of the fluid Pcell evaluation process in accordance with an embodiment of the present disclosure.
Figure 5:
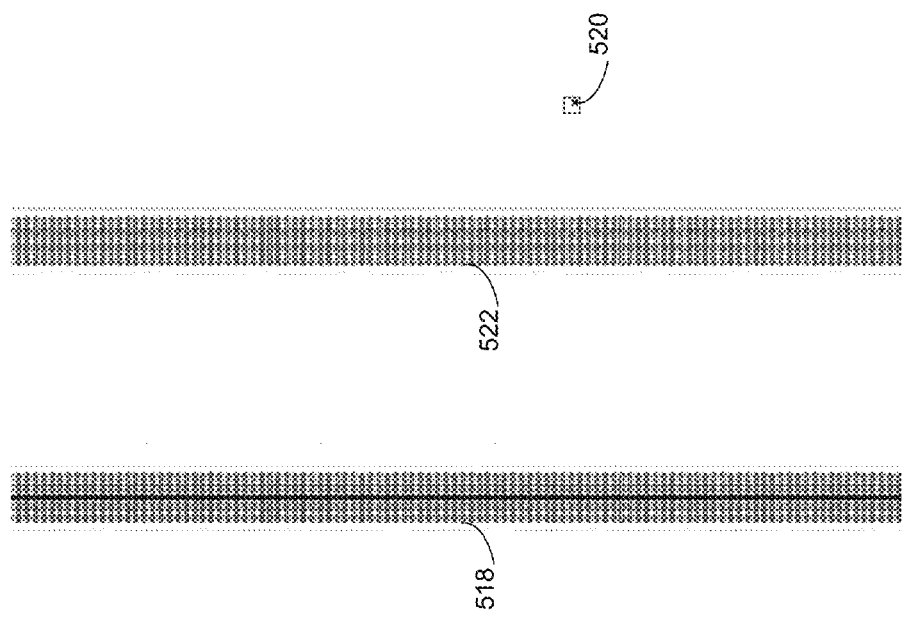
FIG. 5 is a schematic depicting aspects of the fluid Pcell evaluation process in accordance with an embodiment of the present disclosure.

Referring now to FIGS. 4 and 5, a fluid Pcell 418 displayed in a first format is provided. In some embodiments, one or more alterations may be made to a fluid Pcell. Alterations as used herein may include, but are not limited to, interactive creation and/or editing (e.g., moving, dragging, etc.) of a fluid Pcell 418.

In operation, a user may select fluid Pcell 518 with a mouse pointer 520 on a graphical user interface without using a drag API. A user may create and/or edit fluid Pcell 518 with mouse pointer 520. As shown in the example of FIG. 5, fluid Pcell 518 may be dragged to the right on the graphical user interface by mouse pointer 520. During the dragging of fluid Pcell 518, one or more parameters of the fluid Pcell 518 may be changed. Fluid Pcell evaluation process 10 may receive one or more changed parameters for each new position of fluid Pcell 518. For each unique set of parameters, fluid Pcell evaluation process 10 may generate a new fluid Pcell sub master. Fluid Pcell evaluation process 10 may evaluate each new fluid Pcell sub master with all the geometries of fluid Pcell 518 based upon, at least in part, evaluation of each new fluid Pcell sub master with the evaluation code. In some embodiments and as will be explained in greater detail below, fluid Pcell evaluation process 10 may display one or more fluid Pcell instances 522 in the first format based upon, at least in part, the evaluation of each new fluid Pcell sub master with a second portion of the evaluation code and/or the second type of evaluation code.

In some embodiments, the creation and/or evaluation of new fluid Pcell sub masters during the dragging may cause a delay as the evaluation code of each of the one or more fluid Pcell sub masters is evaluated for each position of the mouse pointer 520. In some embodiments, drawing the one or more fluid Pcell instances 522 for each evaluation of the evaluation code of each fluid Pcell sub master may result in a visible lag between the mouse pointer 520 and each fluid Pcell instance 522. As shown, for example purposes only, in FIG. 5, there is a visible gap between the mouse pointer 520 and the fluid Pcell instance 522. Additionally and/or alternatively, the evaluation of Pcell sub masters may significantly increase memory utilization depending on the number of geometries associated with the first format of the fluid Pcell super master.

In some embodiments, fluid Pcell evaluation process 10 may include identifying a first state in a fluid Pcell evaluation code. In some embodiments, the evaluation code of the fluid Pcell 518 may be dynamically changed in response to the user action. In some embodiments, the first state may indicate that one or more alterations are being made to the evaluation code of the fluid Pcell in response to user action. As used herein, "first state", "drag mode" and "drag" may be used synonymously within the scope of the present disclosure and where appropriate. In some embodiments, a SKILL API vfoIsCommandInDragMode( ) may identify whether the Pcell evaluation code is in "drag mode". The API may be used in the fluid Pcell evaluation code to identify which part of the code is evaluated at a given moment. The API may determine whether the Pcell evaluation code is in "drag mode" based upon, at least in part, mouse pointer movement. In some embodiments, identification of the first state may enable a first portion of the evaluation code. A first portion of the evaluation code as used herein may include, but is not limited to, a portion of the evaluation code that, when evaluated, may cause one or more fluid Pcell instances to be displayed in a second format. In some embodiments, identification of the first state may enable a first type of evaluation code. The first type of evaluation code as used herein may include, but is not limited to, a type of evaluation code that, when evaluated, may cause one or more fluid Pcell instances to be displayed in a second format. In other words, the first portion of the evaluation code and the first type of evaluation code when evaluated may cause one or more fluid Pcell instances to be displayed in the second format. As such, the "first portion of the evaluation code" and the "first type of evaluation code" may be used interchangeably within the scope of the present disclosure.

Figure 6:
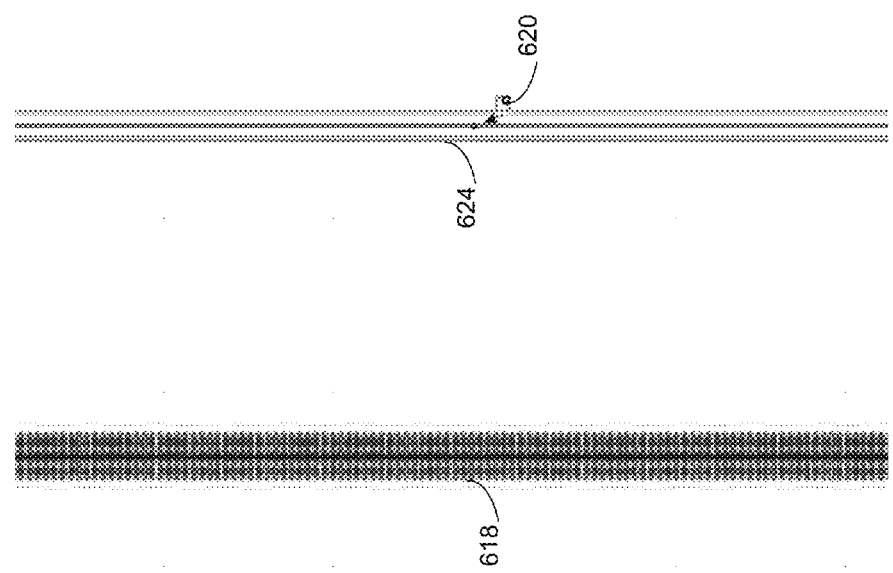
FIG. 6 is a schematic depicting aspects of the fluid Pcell evaluation process in accordance with an embodiment of the present disclosure.
Figure 7:
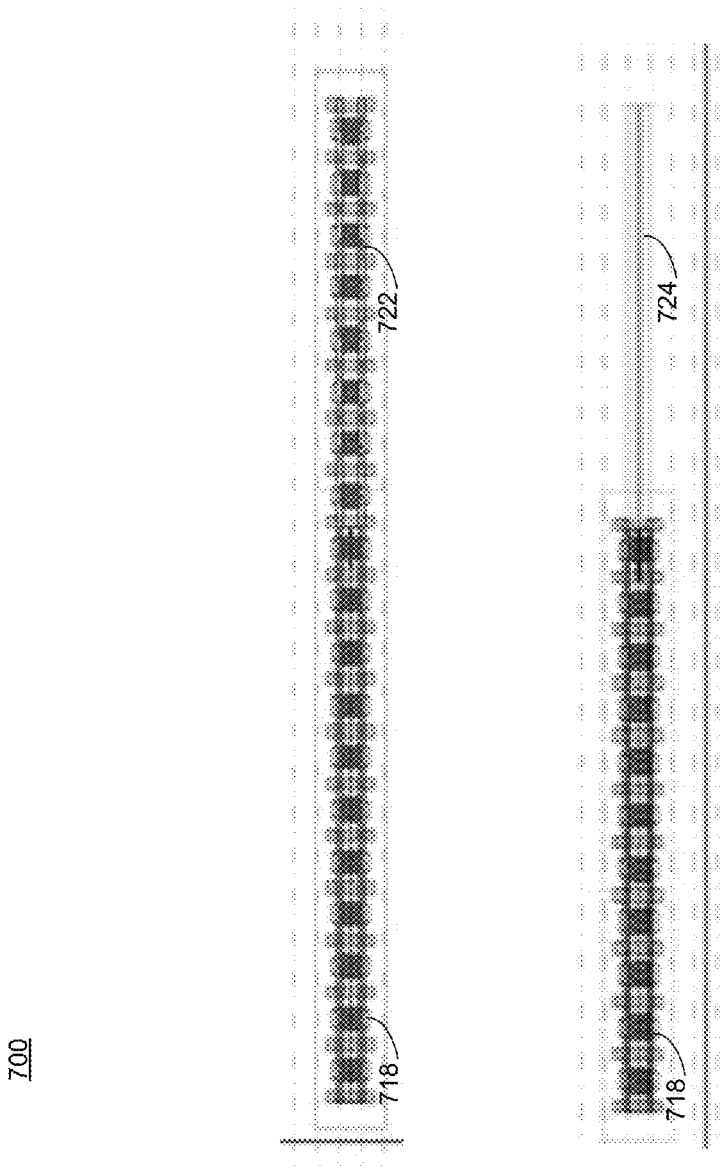
FIG. 7 is a schematic depicting aspects of the fluid Pcell evaluation process in accordance with an embodiment of the present disclosure.
Figure 8:
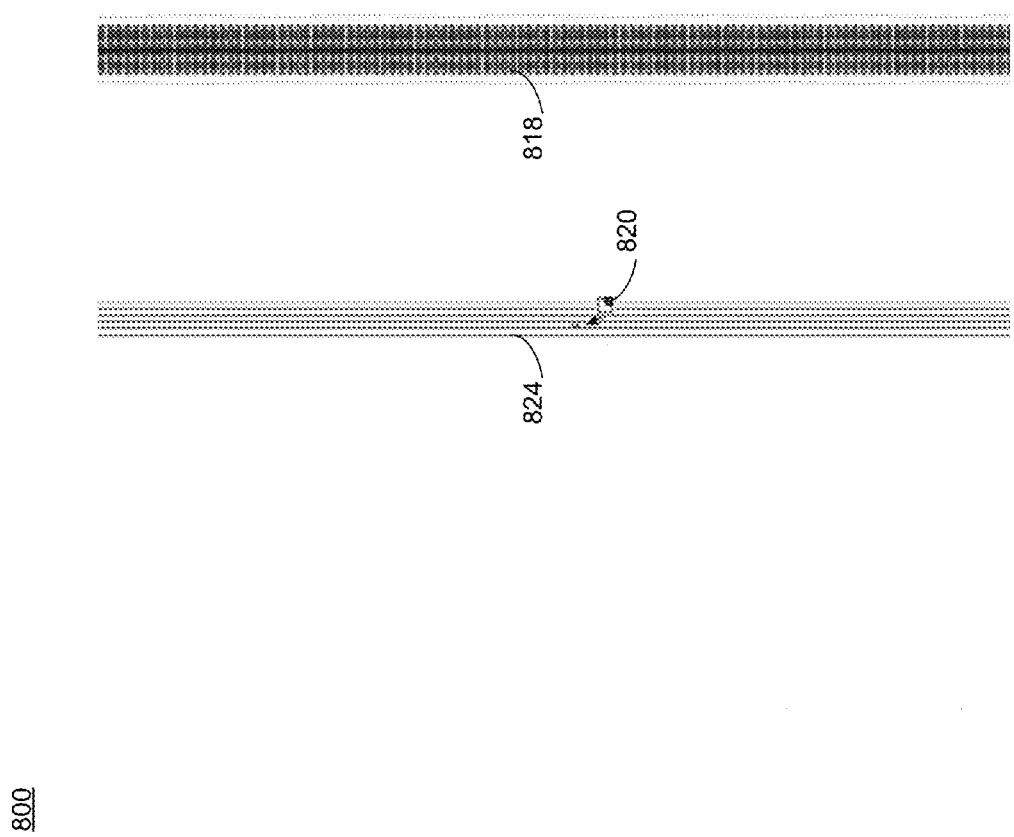
FIG. 8 is a schematic depicting aspects of the fluid Pcell evaluation process in accordance with an embodiment of the present disclosure.

In some embodiments and as shown in FIGS. 6-8, fluid Pcell evaluation process 10 may include displaying one or more instances 624 of the fluid Pcell 618 in a second format based upon, at least in part, identifying the first state in the fluid Pcell evaluation code. In some embodiments, identifying the first state of the evaluation code may enable a first portion of a fluid Pcell evaluation code. The first portion of the evaluation code, that may be called upon and/or evaluated during "drag", may cause one or more fluid Pcell instances to be displayed in the second format. In some embodiments, the second format may include, but is not limited to, fewer geometries than the first format. In some embodiments, the second format may include at least one geometry less than the plurality of geometries of the first format.

In operation, and as shown in FIGS. 6 and 7, a user may select a fluid Pcell 618 with a mouse pointer 620 on a graphical user interface while using a drag API. The fluid Pcell 618 may be dragged and/or moved by the mouse pointer 620 to the right. As fluid Pcell 618 is dragged to the right, one or more parameters may change. As the one or more parameters change, fluid Pcell evaluation process 10 may receive the one or more changed parameters. Fluid Pcell evaluation process 10 may determine that one or more parameters have changed. Fluid Pcell evaluation process 10 may generate one or more new fluid Pcell sub masters based upon, at least in part, the one or more changed parameters. Fluid Pcell evaluation process 10 may identify a first state in the evaluation code of the fluid Pcell. The identification of the first state may cause fluid Pcell evaluation process 10 to enable a first portion of the evaluation code. Fluid Pcell evaluation process 10 may evaluate each new fluid Pcell sub master with limited geometries based upon, at least in part, evaluation of each new fluid Pcell sub master with the first portion of the evaluation code. Fluid Pcell evaluation process 10 may display one or more fluid Pcell instances 624 in the second format based upon, at least in part, the evaluation of each new fluid Pcell sub master with the first portion of the evaluation code. The user may drag the fluid Pcell 618 with the mouse pointer 620 to different positions on the graphical user interface. Each new position may change one or more parameters of fluid Pcell 618. Fluid Pcell evaluation process 10 may receive the one or more parameters and, based on the process described above, display one or more fluid Pcell instances 624 with limited geometries for faster evaluation and optimal memory utilization until the user is finished dragging fluid Pcell 618.

In some embodiments, limited geometry evaluation may remove lag between the mouse pointer 620 and fluid Pcell instances 624 during alterations. In some embodiments, only a fluid shape or fluid outline of fluid Pcell 618 may be displayed with each fluid Pcell instance 624 while the first portion of the evaluation code is enabled in the first state. In some embodiments, fluid Pcell 618 may be continuously displayed in its original position while the one or more fluid Pcell instances 624 are displayed.

In some embodiments, fluid Pcell evaluation process 10 may include identifying a second state in the fluid Pcell evaluation code. In some embodiments, the second state may indicate the completion of the one or more alterations to the fluid Pcell. Therefore, "second state", "done mode" and "done" may be used synonymously within the scope of the present disclosure and where appropriate. In some embodiments, fluid Pcell evaluation process 10 may enable different evaluation codes when an interactive creation/editing command is completed or is in 'done' mode. In some embodiments, a SKILL API vfoIsCommandInDragMode( ) may identify whether the fluid Pcell command and/or evaluation code is in "done mode". In some embodiments, identification of the second state may enable a second portion of the evaluation code. A second portion of the evaluation code as used herein may include, but is not limited to, a portion of the evaluation code that when evaluated may cause one or more fluid Pcell instances to be displayed in the first format. In some embodiments, identification of the second state may enable a second type of evaluation code. The second type of evaluation code as used herein may include, but is not limited to, a type of evaluation code that, when evaluated, may cause one or more fluid Pcell instances to be displayed in the first format. In other words, the second portion of the evaluation code and the second type of evaluation code when evaluated may cause one or more fluid Pcell instances to be displayed in the first format. As such, the "second portion of the evaluation code" and the "second type of evaluation code" may be used interchangeably within the scope of the present disclosure. In some embodiments, the second portion of the evaluation code may be the default portion and/or type of evaluation code to display one or more fluid Pcell instances in the first format.

Figure 9:
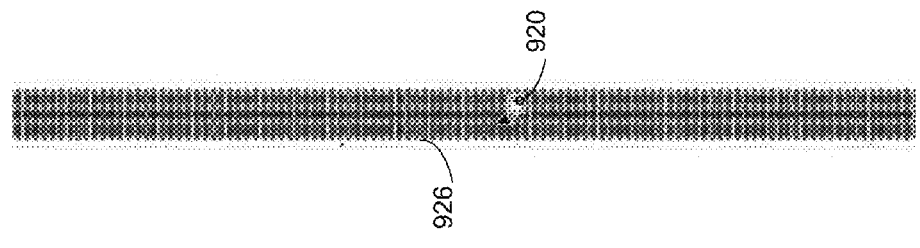
FIG. 9 is a schematic depicting aspects of the fluid Pcell evaluation process in accordance with an embodiment of the present disclosure.

In some embodiments, and as shown in FIGS. 8-9, fluid Pcell evaluation process 10 may include displaying a final instance 926 of the one or more fluid Pcell instances 824 of the fluid Pcell 818 in the first format based upon, at least in part, identifying the second state in the fluid Pcell evaluation code. In some embodiments, identifying the second state of the evaluation code may enable a second portion of a fluid Pcell evaluation code. The second portion of the evaluation code, that may be called upon and/or evaluated during "done", may cause one or more fluid Pcell instances to be displayed in the first format.

In some embodiments, when fluid Pcell evaluation process 10 identifies the second state, no additional fluid Pcell instances 824 may be created. Accordingly, at the identification of the second state, the most current Pcell instance may be a final fluid Pcell instance 926. The evaluation code called at 'done' may enable the second portion of the evaluation code. Evaluation of the final fluid Pcell sub master may display the final instance of the fluid Pcell in the first format 926. In other words, the final instance of the fluid Pcell 926 may include all of the geometries of the fluid Pcell 818. In some embodiments, there may be no delay in evaluation or movement of mouse pointer 820 because of the limited geometries drawn in "drag mode".

In operation and for example purposes only, a user may select a fluid Pcell 818 with a mouse pointer 820 in a graphical user interface. The fluid Pcell 818 may be dragged and/or moved by the mouse pointer 820 to the right. A user may finish dragging fluid Pcell 818. Fluid Pcell evaluation process 10 may stop receiving changed parameters and may determine that the user has completed the dragging of fluid Pcell 818. Fluid Pcell evaluation process 10 may identify a second state in the evaluation code of the fluid Pcell. The identification of the second state may cause fluid Pcell evaluation process 10 to enable a second portion of the evaluation code. Fluid Pcell evaluation process 10 may evaluate the final fluid Pcell sub master with all geometries of fluid Pcell 818 (e.g., the first format) based upon, at least in part, evaluation of the final fluid Pcell sub master with the second portion of the evaluation code. Fluid Pcell evaluation process 10 may display the final fluid Pcell instance 926 in the first format based upon, at least in part, the evaluation of the final fluid Pcell sub master with the second portion of the evaluation code.

Figure 10:
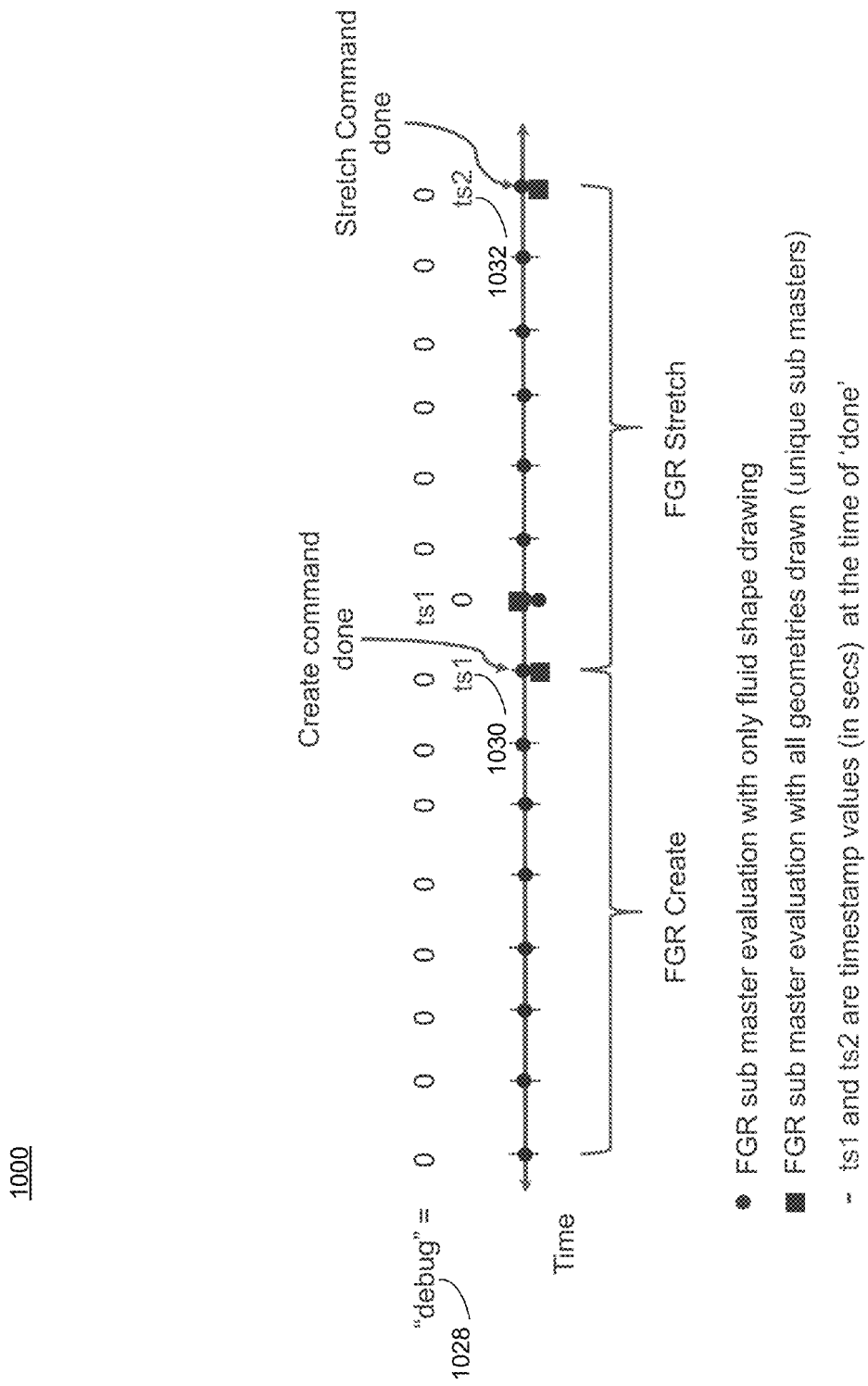
FIG. 10 is a schematic depicting aspects of the fluid Pcell evaluation process in accordance with an embodiment of the present disclosure.

In some embodiments and as shown in FIG. 10, fluid Pcell evaluation process 10 may include setting one or more parameters of the one or more instances of the fluid Pcell to one or more default values based upon, at least in part, identifying the first state in the fluid Pcell evaluation code. Setting as used herein may include, but is not limited to, assigning, resetting, and/or defining one or more parameters to any value that the user may want to define. One or more parameter values may be set to a default value during 'drag' to ensure that any fluid Pcell sub master created during 'drag' is not unique. This unique parameter value may also ensure that no fluid Pcell sub master created during 'drag' (as a result of any previous or current create/edit operation) is used at 'done' stage. In some embodiments, because a unique value of any of the one or more parameters may be set to a default value during 'drag', one or more of the fluid Pcell sub masters may be reused since they may not be unique.

In some embodiments, fluid Pcell evaluation process 10 may include setting the one or more parameters of the final instance 926 of the one or more instances 824 of the fluid Pcell 818 to one or more values based upon, at least in part, identifying the second state in the fluid Pcell evaluation code. In some embodiments, the one or more values may include, but are not limited to, predefined values. In some embodiments the fluid Pcell may include a Fluid Guard Ring (FGR). A FGR may include but is not limited to a type of fluid Pcells in which shapes may be drawn based on one or more fluid shape points. In some embodiments, FGRs may be created and graphically edited on graphical user interface. In some embodiments, a predefined unique value may be assigned to this parameter at 'done'. In some embodiments, a timestamp may be used as the value, which may ensure that no two fluid Pcell sub masters get the same "debug" 1028 parameter value.

For example, as shown in FIG. 10, a parameter "debug" 1028 may be used to force evaluation at "done". This may be an internal parameter which may not change in FGR drawing code (vfoSfDraw( )). The parameter "debug" 1028 may not change the geometry of the fluid Pcell. The parameter "debug" 1028 may be assigned with a unique value 1030 (e.g., a timestamp "ts1") when the fluid Pcell has been created. While dragging during any creation or editing command, the parameter "debug" 1028 value may be set to "0" at the first evaluation, which may be its default value. When the dragging command is completed, the parameter "debug" 1028 may be assigned with a second value 1032 (e.g., timestamp "ts2"). Because the second value 1032 may be different than the first value, the fluid Pcell sub master may be evaluated at "done". In some embodiments, vfoSfDraw( ) may use the API vfoIsCommandInDragMode( ) to identify if a command is in 'drag' or 'done' mode. During 'drag', only the fluid shape may be drawn as a result of Pcell evaluation. At 'done' all the geometries may be drawn during Pcell evaluation.

In some embodiments, fluid Pcell evaluation process 10 may include evaluating the final instance 926 of the one or more instances 824 of the fluid Pcell 818 to verify that the first format of the final instance 926 of the fluid Pcell is equivalent to the first format of the fluid Pcell 818 based upon, at least in part, the one or more values of the one or more parameters. At 'done', an evaluation may be required to ensure that the final instance 926 of the fluid Pcell 818 contains all the geometries. Identification of a 'done' state only may not help, as a displayed fluid Pcell instance may already be evaluated (e.g., current fluid Pcell sub master may exist in memory) and, at 'done', no more calls may be sent for re-evaluation. To force the evaluation, a fluid Pcell parameter (e.g., parameter "X" which may not be used in the fluid Pcell evaluation code) value is changed to a unique value. This change in parameter value may cause re-evaluation of Pcell instance at 'done'. In some embodiments, fluid Pcell evaluation process 10 may need to ensure that no sub master created during any 'drag' operation has the same footprint as the sub master being created at 'done'. In some embodiments, all fluid Pcell instances placed on layout canvas may have unique sub masters which may ensure an evaluation at command 'done'.

Returning to the FGR example, the parameter "debug" may be assigned to a first value when the fluid Pcell is being created and/or edited and assigned a second value when the fluid Pcell is done being created and/or edited. In some embodiments, because the second value 1032 may be different than the first value, the fluid Pcell sub master may be evaluated at "done". Additionally and/or alternatively, the final instance 926 may be compared to the fluid Pcell to ensure that the final instance 926 of the fluid Pcell contains all the geometries of the fluid Pcell 818 and/or is equivalent to fluid Pcell 818.

In some embodiments utilizing the fluid Pcell evaluation process 10 with a FGR, a 30%-80% reduction in memory utilization during 'drag' in interactive create/edit of a FGR instance may be observed. The reduction of memory utilization may be proportional to the number of FGR evaluations during "drag" and may also depend on the number of evaluated geometries in the FGR instance. Additionally, a 2×-3.5× performance improvement during "drag" in interactive create/edit of a FGR instance with limited geometry may be obtained. However, this may depend on FGR Pcell code complexity. Further, in some embodiments utilizing fluid Pcell evaluation process 10, there may not be a visible lag between mouse pointer and evaluated sub master geometries during 'drag'.

In some embodiments of the present disclosure, fluid Pcell evaluation process 10 may enable a "limited" geometry evaluation and drawing during sub master evaluation at different points during drag. This concept may not only reduce the memory consumption by a significant amount but also may enable seamless movement of sub master geometries with a mouse pointer. In some embodiments, fluid Pcell evaluation process 10 may make interactive creation and editing of a fluid Pcell instance a lot smoother. Fluid Pcell evaluation process 10 may enable use of different evaluation codes during interactive creation and editing of a fluid Pcell to reduce memory utilization and improve performance during drag. However, while two extra sub masters may be created, one at the time of "done" and other at the first evaluation of Pcell sub master during "drag", the overall memory utilization may be far superior to any memory consumption by these extra sub masters.

Fluid Pcell evaluation process 10 may be configured to operate with various EDA applications such as those available from the Assignee of the present disclosure, which may allow the user to make alterations to a fluid Pcell within a design while reducing memory utilization and improving performance.

In some embodiments, EDA application 20 may support a variety of languages and/or standards. Some of these may include, but are not limited to, IEEE-standard languages, the Open Verification Methodology (OVM), the emerging Accellera Universal Verification Methodology (UVM), and the e Reuse Methodology (eRM). EDA application 20 may support e, Open Verification Library (OVL), OVM class library, emerging UVM class library, SystemC®, SystemC Verification Library, SystemVerilog, Verilog®, VHDL, PSL, SVA, CPF, as well as numerous other languages. EDA application 20 may be used in accordance with mixed-language, mixed-signal, and low-power designs, across multiple levels of abstraction, and may include the ability to "hot swap" the RTL simulation in/out of numerous accelerators/emulators.

As used in any embodiment described herein, the terms "circuit" and "circuitry" may include, for example, singly or in any combination, hardwired circuitry, programmable circuitry, state machine circuitry, and/or firmware that stores instructions executed by programmable circuitry. It should be understood at the outset that any of the operations and/or operative components described in any embodiment herein may be implemented in software, firmware, hardwired circuitry and/or any combination thereof. Embodiments of the present disclosure may be incorporated in whole or in part into any design tools.

As will be appreciated by one skilled in the art, the present disclosure may be embodied as a method, system, or computer program product. Accordingly, the present disclosure may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, the present disclosure may take the form of a computer program product on a computer-usable storage medium having computer-usable program code embodied in the medium.

Any suitable computer usable or computer readable medium may be utilized. The computer readable medium may be a computer readable signal medium or a computer readable storage medium. A computer-usable, or computer-readable, storage medium (including a storage device associated with a computing device or client electronic device) may be, for example, but not limited to, an electronic, magnetic, optical, electromagnetic, infrared, or semiconductor system, apparatus, or device, or any suitable combination of the foregoing. More specific examples (a non-exhaustive list) of the computer-readable medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device. In the context of this document, a computer-usable, or computer-readable, storage medium may be any tangible medium that can contain, or store a program for use by or in connection with the instruction execution system, apparatus, or device.

A computer readable signal medium may include a propagated data signal with computer readable program coded embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device. Program code embodied on a computer readable medium may be transmitted using any appropriate medium, including but not limited to wireless, wireline, optical fiber cable, RF, etc., or any suitable combination of the foregoing.

Computer program code for carrying out operations of the present disclosure may be written in an object oriented programming language such as Java, Smalltalk, C++ or the like. However, the computer program code for carrying out operations of the present disclosure may also be written in conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through a local area network (LAN) or a wide area network (WAN), or the connection may be made to an external computer (for example, through the Internet using an Internet Service Provider).

The present disclosure is described below with reference to flowchart illustrations and/or block diagrams of methods, apparatus (systems) and computer program products according to embodiments of the disclosure. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer-readable memory that can direct a computer or other programmable data processing apparatus to function in a particular manner, such that the instructions stored in the computer-readable memory produce an article of manufacture including instructions which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide steps for implementing the functions/acts specified in the flowchart and/or block diagram block or blocks.

It will be apparent to those skilled in the art that various modifications and variations can be made in the embodiments of the present disclosure without departing from the spirit or scope of the present disclosure. Thus, it is intended that embodiments of the present disclosure cover the modifications and variations provided they come within the scope of the appended claims and their equivalents.

What is claimed is:

1. A computer-implemented method comprising:
   displaying, using a processor at a graphical user interface, a fluid parameterized cell (Pcell) in a first format;
   identifying a first state in a fluid Pcell evaluation code, wherein the first state indicates that one or more alterations are being made to the fluid Pcell, wherein the one or more alterations include at least one of creating or editing of the fluid Pcell;
   displaying, at the graphical user interface, one or more instances of the fluid Pcell in a second format based upon, at least in part, identifying the first state in the fluid Pcell evaluation code;
   identifying a second state in the fluid Pcell evaluation code, wherein the second state indicates the completion of the one or more alterations to the fluid Pcell; and
   displaying, at the graphical user interface, a final instance of the one or more instances of the fluid Pcell in the first format based upon, at least in part, identifying the second state in the fluid Pcell evaluation code.

2. The computer-implemented method of claim 1, wherein the first format includes a plurality of geometries.

3. The computer-implemented method of claim 2, wherein the second format includes at least one geometry less than the plurality of geometries of the first format.

4. The computer-implemented method of claim 1, further comprising:
   setting one or more parameters of the one or more instances of the fluid Pcell to one or more default values based upon, at least in part, identifying the first state in the fluid Pcell evaluation code.

5. The computer-implemented method of claim 4, further comprising:
   setting the one or more parameters of the final instance of the one or more instances of the fluid Pcell to one or more values based upon, at least in part, identifying the second state in the fluid Pcell evaluation code.

6. The computer-implemented method of claim 5, further comprising:
   evaluating the final instance of the one or more instances of the fluid Pcell to verify that the first format of the final instance of the fluid Pcell is equivalent to the first format of the fluid Pcell based upon, at least in part, the one or more values of the one or more parameters.

7. The computer-implemented method of claim 5, wherein the one or more values are one or more timestamp values.

8. A computer-readable storage medium having stored thereon instructions that when executed by a machine result in the following operations:
   displaying, at a graphical user interface, a fluid parameterized cell (Pcell) in a first format;
   identifying a first state in a fluid Pcell evaluation code, wherein the first state indicates that one or more alterations are being made to the fluid Pcell, wherein the one or more alterations include at least one of creating or editing of the fluid Pcell;
   displaying, at the graphical user interface, one or more instances of the fluid Pcell in a second format based upon, at least in part, identifying the first state in the fluid Pcell evaluation code;
   identifying a second state in the fluid Pcell evaluation code, wherein the second state indicates the completion of the one or more alterations to the fluid Pcell; and
   displaying, at the graphical user interface, a final instance of the one or more instances of the fluid Pcell in the first format based upon, at least in part, identifying the second state in the fluid Pcell evaluation code.

9. The computer-readable storage medium of claim 8, wherein the first format includes a plurality of geometries.

10. The computer-readable storage medium of claim 9, wherein the second format includes at least one geometry less than the plurality of geometries of the first format.

11. The computer-readable storage medium of claim 8, further comprising:
    setting one or more parameters of the one or more instances of the fluid Pcell to one or more default values based upon, at least in part, identifying the first state in the fluid Pcell evaluation code.

12. The computer-readable storage medium of claim 11, further comprising:
    setting the one or more parameters of the final instance of the one or more instances of the fluid Pcell to one or more values based upon, at least in part, identifying the second state in the fluid Pcell evaluation code.

13. The computer-readable storage medium of claim 12, further comprising:
    evaluating the final instance of the one or more instances of the fluid Pcell to verify that the first format of the final instance of the fluid Pcell is equivalent to the first format of the fluid Pcell based upon, at least in part, the one or more values of the one or more parameters.

14. The computer-readable storage medium of claim 12, wherein the one or more values are one or more timestamp values.

15. A system comprising:
    a computing device having at least one processor configured to display, at a graphical user interface, a fluid parameterized cell (Pcell) in a first format, and identify a first state in a fluid Pcell evaluation code, wherein the first state indicates that one or more alterations are being made to the fluid Pcell, and wherein the one or more alterations include at least one of creating or editing of the fluid Pcell, the at least one processor further configured to display, at the graphical user interface, one or more instances of the fluid Pcell in a second format based upon, at least in part, identifying the first state in the fluid Pcell evaluation code, the at least one processor further configured to identify a second state in the fluid Pcell evaluation code, wherein the second state indicates the completion of the one or more alterations to the fluid Pcell, the at least one processor further configured to display, at the graphical user interface, a final instance of the one or more instances of the fluid Pcell in the first format based upon, at least in part, identifying the second state in the fluid Pcell evaluation code.

16. The system of claim 15, wherein the first format includes a plurality of geometries.

17. The system of claim of claim 16, wherein the second format includes at least one geometry less than the plurality of geometries of the first format.

18. The system of claim of claim 15, the at least one processor further configured to:
set one or more parameters of the one or more instances of the fluid Pcell to one or more default values based upon, at least in part, the identification of the first state in the fluid Pcell evaluation code.

19. The system of claim of claim 18, the at least one processor further configured to:
modify the one or more parameters of the final instance of the one or more instances of the fluid Pcell to one or more values based upon, at least in part, the identification of the second state in the fluid Pcell evaluation code.

20. The system of claim of claim 19, the at least one processor further configured to:
evaluate the final instance of the one or more instances of the fluid Pcell to verify that the first format of the final instance of the fluid Pcell is equivalent to the first format of the fluid Pcell based upon, at least in part, the one or more values of the one or more parameters.

* * * * *